US011055562B1

(12) United States Patent
Haeusler et al.

(10) Patent No.: US 11,055,562 B1
(45) Date of Patent: Jul. 6, 2021

(54) METHODS AND SYSTEMS FOR REGISTERING A THREE-DIMENSIONAL POSE OF AN OBJECT

(71) Applicant: The Boeing Company, Chicago, IL (US)

(72) Inventors: Phillip Haeusler, Chicago, IL (US); Alexandre Desbiez, Chicago, IL (US)

(73) Assignee: The Boeing Company, Chicago, IL (US)

( * ) Notice: Subject to any disclaimer, the term of this patent is extended or adjusted under 35 U.S.C. 154(b) by 17 days.

(21) Appl. No.: 16/732,489

(22) Filed: Jan. 2, 2020

(51) Int. Cl.
*G06K 9/62* (2006.01)
*G05B 19/418* (2006.01)
*G06T 7/521* (2017.01)
*G06T 7/30* (2017.01)

(52) U.S. Cl.
CPC ........ *G06K 9/6211* (2013.01); *G05B 19/4183* (2013.01); *G06T 7/30* (2017.01); *G06T 7/521* (2017.01)

(58) Field of Classification Search
CPC .. G06K 9/6211; G05B 19/4183; G06T 7/521; G06T 7/30

USPC ......................................................... 382/154
See application file for complete search history.

(56) References Cited

U.S. PATENT DOCUMENTS

| | | | |
|---|---|---|---|
| 2006/0088203 A1* | 4/2006 | Boca | ........................ G06K 9/32 382/153 |
| 2018/0056515 A1* | 3/2018 | Boca | ...................... B25J 9/1697 |

* cited by examiner

*Primary Examiner* — Ayodeji O Ayotunde
(74) *Attorney, Agent, or Firm* — McDonnell Boehnen Hulbert & Berghoff LLP

(57) ABSTRACT

In an example, a system for registering a three-dimensional (3D) pose of a workpiece relative to a robotic device is disclosed. The system comprises the robotic device, where the robotic device comprises one or more mounted lasers. The system also comprises one or more sensors configured to detect laser returns from laser rays projected from the one or more mounted lasers and reflected by the workpiece. The system also comprises a processor configured to receive a tessellation of the workpiece, wherein the tessellation comprises a 3D representation of the workpiece made up of cells, convert the laser returns into a 3D point cloud in a robot frame, based on the 3D point cloud, filter visible cells of the tessellation of the workpiece to form a tessellation included set, and solve for the 3D pose of the workpiece relative to the robotic device based on the tessellation included set.

20 Claims, 8 Drawing Sheets

METHODS AND SYSTEMS FOR REGISTERING A THREE-DIMENSIONAL POSE OF AN OBJECT

FIELD

The present disclosure relates generally to three-dimensional (3D) pose registration, and more particularly, to processes for registering a 3D pose of an object with respect to a robotic device or other type of computing device.

BACKGROUND

Robotic devices, augmented reality (AR) devices, and other similar devices are becoming more involved in the manufacturing process of various physical objects, or "workpieces," such as aircraft components. In order for such a device to perform work on or otherwise interact with an object in an environment, such as machining the object or sanding the object, the object's 3D pose (e.g., the object's position and orientation relative to a reference coordinate system, such as a global reference frame) with respect to the device is registered with the device.

To accomplish this, existing systems typically use camera-based methods or laser tracking. Existing camera-based methods often require a special physical feature (e.g., fiducial) to be installed on the object at a precise location and require that the camera lens be precisely calibrated. However, existing techniques for precise lens calibration can be difficult and may not be robust to changes in certain manufacturing environments. Further, some existing camera-based methods do not always successfully achieve pose accuracy greater than one millimeter (mm). Existing laser tracking methods often require highly reflective features (e.g., laser balls) to be mounted to the object at precise locations and often use physically actuated lasers that allow precise control of laser beams. However, existing laser trackers/scanners (e.g., triangulation lasers) can be very expensive and existing laser tracking methods, despite often being more accurate than existing camera-based methods for pose registration, can be time consuming (e.g., approximately four hours to calibrate). Some alternative existing methods for pose registration can have similar drawbacks. For instance, some existing solutions discretize an object's tessellation into points and perform iterative closest point (ICP) algorithms using those points and a separate 3D point cloud. However, such discretization can decrease pose registration accuracy and increase CPU overhead.

What is needed is a less expensive and more efficient technique that registers an object's pose with higher accuracy.

SUMMARY

In an example, a registration system for registering a 3D pose of a workpiece relative to a robotic device is described. The registration system comprises the robotic device, where the robotic device comprises one or more mounted lasers. The registration system also comprises one or more sensors configured to detect laser returns from laser rays projected from the one or more mounted lasers and reflected by the workpiece. The registration system also comprises a processor. The processor is configured to receive a tessellation of the workpiece, where the tessellation comprises a 3D representation of the workpiece made up of cells. The processor is also configured to convert the laser returns into a 3D point cloud in a robot frame. The processor is also configured to based on the 3D point cloud, filter visible cells of the tessellation of the workpiece to form a tessellation included set. The processor is also configured to solve for the 3D pose of the workpiece relative to the robotic device based on the tessellation included set.

In another example, a method for registering a 3D pose of a workpiece relative to a robotic device is described. The method comprises receiving, by a processor, a tessellation of the workpiece, where the tessellation comprises a 3D representation of the workpiece made up of cells. The method also comprises converting, by the processor, laser returns into a 3D point cloud in a robot frame, where the laser returns are detected by one or more sensors, and where the laser returns are from laser rays projected from one or more mounted lasers of the robotic device and reflected by the workpiece. The method also comprises based on the 3D point cloud, filtering, by the processor, visible cells of the tessellation of the workpiece to form a tessellation included set. The method also comprises solving, by the processor, for the 3D pose of the workpiece relative to the robotic device based on the tessellation included set.

In another example, a non-transitory computer readable medium having stored thereon instructions, that when executed by one or more processors of a computing device, cause the computing device to perform operations is described. The operations comprise receiving a tessellation of a workpiece, where the tessellation comprises a three-dimensional (3D) representation of the workpiece made up of cells. The operations also comprise converting laser returns into a 3D point cloud in a robot frame, where the laser returns are detected by one or more sensors, and where the laser returns are from laser rays projected from one or more mounted lasers of a robotic device and reflected by the workpiece. The operations also comprise based on the 3D point cloud, filtering visible cells of the tessellation of the workpiece to form a tessellation included set. The operations also comprise based on the tessellation included set, solving for a 3D pose of the workpiece relative to the robotic device.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
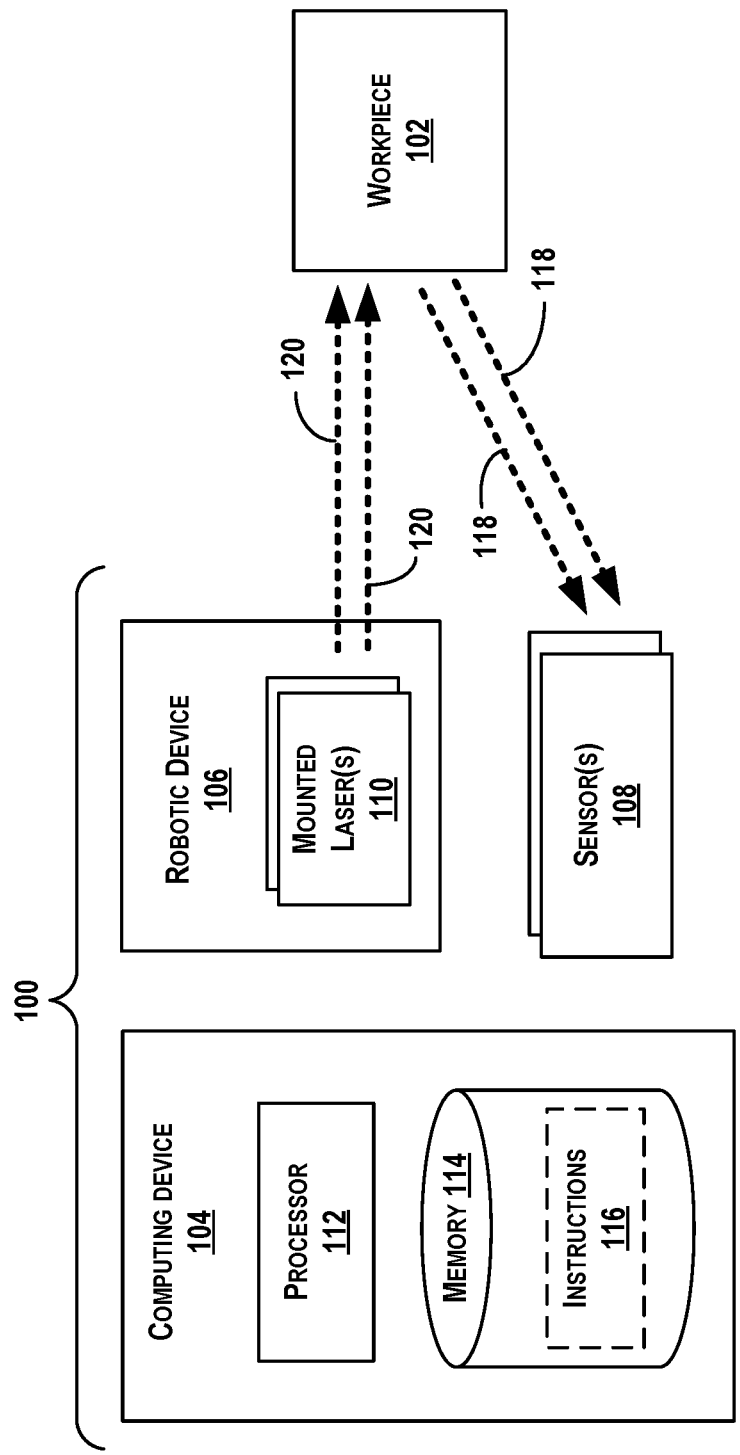
FIG. 1 depicts a system for use in registering 3D poses of objects, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Described herein are methods and systems for accurate registration of a 3D pose of a workpiece or other type of object relative to a robotic device, particularly using lasers. One or more lasers, as well as one or more laser sensors, can be mounted to the robotic device, which can be a mobile robot (e.g., on wheels) or another type of robotic device. In some embodiments, the laser sensors might be mounted at a location other than the robotic device.

A computing device or devices of a disclosed system (e.g., computing device(s) having a processor and memory and configured to control operation of the robotic device and the lasers/sensors associated therewith) can control the one or more mounted lasers to project laser rays, and the resulting laser returns reflected by the workpiece can be detected by the one or more sensors (e.g., laser scanners). The computing device converts the laser returns into a 3D point cloud in a robot frame. (Each of the one or more sensors has a frame from which data is measured, and the robotic device has a frame to describe its origin. Measurements from the sensor(s) can thus be transformed into the robot frame so that data can be combined.) The 3D point cloud is an initial guess of the workpiece's pose with respect to the robotic device. The computing device can thus solve for the 3D pose of the workpiece by using one or more optimization techniques (e.g., a non-linear optimization technique) to minimize the difference between the 3D point cloud and a separate 3D representation of the workpiece—namely, a tessellation made up of cells. The tessellation can be stored in the form of a computer-aided design (CAD) object or other form of 3D representation. The present disclosure will primarily describe the cells that make up the tessellation as being triangles, but it should be understood that the cells can have other geometries.

To solve for the 3D pose of the workpiece with high accuracy (e.g., within at least one micrometer), the disclosed method filters visible cells of the tessellation to form a "tessellation included set"—that is, cells of the tessellation that are most helpful for accurately determining the 3D pose of the workpiece. Thus, the disclosed method advantageously filters out all mesh from the tessellation that will not be helpful and/or will be less useful for use in registering the 3D pose. The disclosed method can include at least one filtering technique to determine the tessellation included set. For example, the tessellation included set can include only cells that intersect laser ray traces from the laser(s). Alternatively, the tessellation included set can include only cells that intersect laser ray traces from the laser(s) and have an orientation facing the one or more sensors. Other filtering techniques are possible as well.

By filtering the cells as discussed above or in similar ways, the disclosed method can eliminate or reduce the need for internal (non-visible) feature alignment during 3D pose registration, thereby increasing processing efficiency. As a result, the disclosed method efficiently determines a high-accuracy 3D pose of the workpiece, which can in turn advantageously facilitate precise manufacturing tasks with respect to the workpiece, such as the robotic device sanding the workpiece.

These and other improvements are described in more detail below. Implementations described below are for purposes of example. The implementations described below, as well as other implementations, may provide other improvements as well.

Referring now to the figures, FIG. 1 is an example of a system 100 for use in registering 3D poses of objects. Workpiece 102 is shown as an example of an object for which the system 100 can register a 3D pose. As shown, the system 100 includes a computing device 104, a robotic device 106, and one or more sensors 108. The robotic device 106 is shown to include one or more mounted lasers 110, and the computing device 104 is shown to include a processor 112, a memory 114, and instructions 116 for execution by the processor 112.

The workpiece 102 can take the form of an object that is observable, and perhaps manipulatable (e.g., moved, cut, machined, etc.), in an environment by humans, a robotic device, and/or other equipment. For example, the workpiece 102 can be an object used in the manufacturing of an aircraft or other vehicle, such as a layup mandrel tool used for the fabrication of composite parts (e.g., for an aircraft). Alternatively, the workpiece 102 can be any other type of object that components of the system 100 (e.g., the robotic device 106) can observe, and perhaps manipulate, in the environment.

The computing device 104 can take the form of a client device (e.g., a computing device that is actively operated by a user), a server, or some other type of computational platform. In some examples, the computing device 104 can take the form of a desktop computer, laptop computer, tablet computer, smartphone, wearable computing device (e.g., AR glasses), or other type of device. The computing device 104 can be included as part of the robotic device 106 (e.g., an onboard computing system) or as a separate device from the robotic device 106 (e.g., a server or global system configured to manage performance of operations by the robotic device 106 or across multiple robotic devices).

The robotic device 106 can take the form of a mobile or stationary robot with physical components (e.g., a manipulator, such as an arm and/or gripper) as well as software components that enable the robotic device 106 to perform operations associated with the workpiece 102. The robotic device 106 can be configured to operate in an autonomous mode, a partially autonomous mode where some robotic operations are controlled by a human operator, or a mode in which the robotic device 106 is controlled entirely by a human operator. The robotic device 106 can include power source(s) (e.g., a battery) configured to supply power to various components of the robotic device 106. As an example, the robotic device 106 can be a mobile robot having wheels and at least one mechanical arm. In some examples, one or more robotic devices may use different modes of transportation besides wheels on the ground. For instance, one or more robotic devices may be airborne (e.g., drones), and may be used for tasks such as moving objects or collecting data (e.g., laser scans, camera images, etc.) of the workpiece 102 and/or a surrounding environment of the workpiece 102. In some embodiments, the robotic device 106 can include the one or more sensors 108. Example operations that the robotic device 106 can be controlled to perform include, but are not limited to, acquiring images and/or laser scans of the workpiece 102 (e.g., via the one or more mounted lasers 110 and/or the one or more sensors 108), moving the workpiece 102, or performing other interactions with the workpiece 102 (e.g., sanding, painting, cleaning, the workpiece 102).

One or more sensors of the one or more sensors 108 can take the form of a sensing instrument (e.g., a LIDAR sensor or triangulation laser) that is configured to detect laser returns 118 from laser rays 120 projected from the one or more mounted lasers 110 and reflected by the workpiece 102. The one or more sensors 108 can be included as part of the robotic device 106 (e.g., mounted to the robotic device 106, such as mounted to an arm of the robotic device 106) or can be separate component(s) located remotely from the robotic device 106 (e.g., cameras mounted at fixed locations in a warehouse or other environment). In some examples, the one or more sensors 108 can be configured to acquire various measurements, such as a measurement of a distance to the workpiece 102 by measuring the laser returns 118 reflected by the workpiece 102, which the computing device 104 can then use in performing various tasks, such as creating a 3D representation (e.g., a CAD model or 3D point cloud) of the workpiece 102. Other sensor operations are possible as well.

One or more mounted lasers of the one or more mounted lasers 110 can take the form of an instrument (e.g., a LIDAR sensor or triangulation laser) that is configured to project laser rays 120 into the environment, such as onto the workpiece 102. The one or more mounted lasers 110 can be included as part of the robotic device 106 (e.g., mounted to the robotic device 106, such as mounted to an arm of the robotic device 106) as shown or can be separate component(s) located remotely from the robotic device 106 (e.g., lasers mounted at fixed locations in a warehouse or other environment).

In some embodiments, the one or more sensors 108 and the one or more mounted lasers 110 can be integrated with each other. For example, a mounted laser of the one or more mounted lasers 110 that projects laser rays can also be configured to detect laser returns from such laser rays.

The processor 112 can be a general-purpose processor or special purpose processor (e.g., a digital signal processor, application specific integrated circuit, etc.). As noted above, the processor 112 can be configured to execute the instructions 116 (e.g., computer-readable program instructions including computer executable code) that are stored in the memory 114 and are executable to provide various operations described herein. In alternative examples, the computing device 104 can include additional processors that are configured in the same manner.

The memory 114 can take the form of one or more computer-readable storage media that can be read or accessed by the processor 112. The computer-readable storage media can include volatile and/or non-volatile storage components, such as optical, magnetic, organic or other memory or disc storage, which can be integrated in whole or in part with the processor 112. The memory 114 is considered non-transitory computer readable media. In some examples, the memory 114 can be implemented using a single physical device (e.g., one optical, magnetic, organic or other memory or disc storage unit), while in other examples, the memory 114 can be implemented using two or more physical devices.

Example operations for registering a 3D pose of the workpiece 102 will now be described with reference to FIG. 2. The term "workpiece 102" will be used in describing FIG. 2, although FIG. 2 does not explicitly depict the workpiece 102. Rather, FIG. 2 depicts at least one 3D representation of the workpiece 102.

Figure 2:
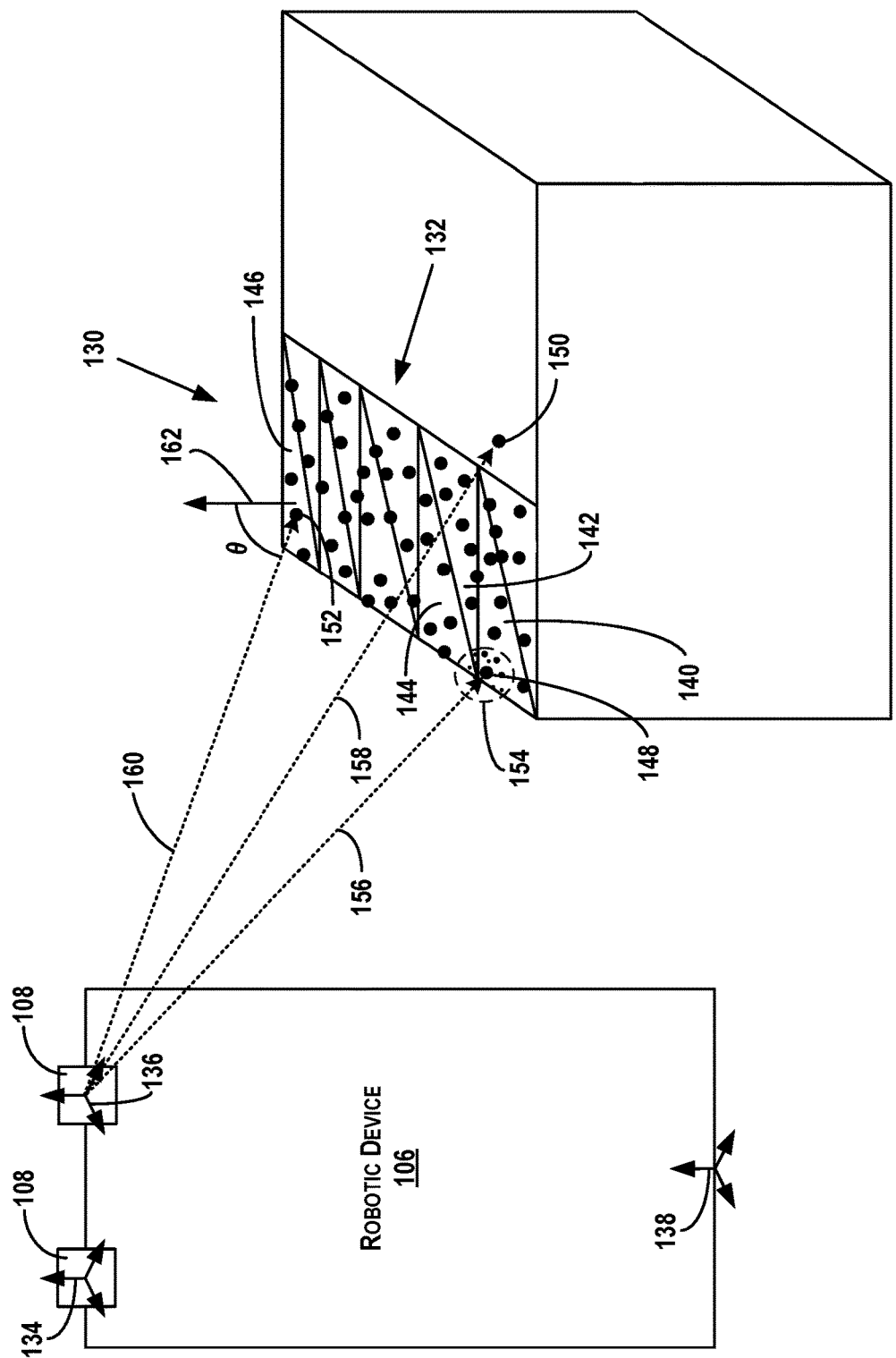
FIG. 2 depicts a robotic device, a tessellation of a workpiece, and points from a 3D point cloud of the workpiece, according to an example implementation.

FIG. 2 depicts the robotic device 106, an example of a tessellation 130 of the workpiece 102, and points from an example of a 3D point cloud 132 of the workpiece 102. As shown, the robotic device 106 includes the one or more sensors 108, which take the form of two sensors that are configured with lasers to project laser rays and are also configured to detect laser returns. Thus, with respect to the example of FIG. 2, the two sensors are integrated with the one or more mounted lasers 110 of FIG. 1.

In operation, one sensor has a sensor frame 134 from which data is measured and the other sensor has a sensor frame 136 from which data is measured. Further, the robotic device 106 has a robot frame 138 associated with the robotic device's origin. As noted above, measurements from sensors can be transformed into the robot frame 138 so that data acquired by the sensors can be combined (e.g., 3D point data from the two sensors).

The tessellation 130 shown in FIG. 2 is made up of cells in the form of triangles, such as triangle 140, triangle 142, triangle 144, and triangle 146, among others. Although only ten triangles are explicitly shown in the tessellation 130 of FIG. 2 as representative examples, it should be understood that the tessellation 130 can include more or less triangles. As noted above, the tessellation 130 can be stored in the form of a CAD object or other form of 3D representation.

The 3D point cloud 132 shown in FIG. 2 is made up of points, such as point 148, point 150, and point 152, among others. Although only some points are explicitly shown in the 3D point cloud 132 of FIG. 2 as representative examples, it should be understood that the 3D point cloud 132 can include more or less points.

In some embodiments, the computing device 104 (e.g., the processor 112) can control the robotic device 106 to project laser rays from the one or more sensors 108 and detect laser returns from the laser rays reflected by the workpiece 102. The computing device 104 can then convert the laser returns into a 3D point cloud 132 in the robot frame 138. In alternative embodiments, the computing device 104 can receive the 3D point cloud 132 as data from another computing device instead of constructing the 3D point cloud 132.

The computing device 104 can also receive the tessellation 130 of the workpiece 102, and use the tessellation 130 and the 3D point cloud 132 to solve for the 3D pose of the workpiece 102. As discussed above, to solve for the 3D pose with high accuracy (e.g., within at least one micrometer), the computing device 104 can perform operations to filter visible cells (e.g., visible triangles) of the tessellation 130 to form a tessellation included set. Visible cells can take the form of cells of the tessellation 130, such as cells on a top or outer surface of the tessellation 130, that are visible from the perspective of the one or more sensors 108 and/or are more likely than some other cells of the tessellation 130 to intersect laser rays projected from the one or more mounted lasers 110. An additional advantage of filtering visible cells is an increase in processing efficiency, since less useful cells and/or points of the 3D point cloud 132 are filtered out from consideration.

As an example first technique for filtering visible cells, for each laser return of the laser returns, the computing device 104 can add noise to a point in the 3D point cloud 132 and trace a laser ray from one of the one or more mounted lasers 110 (e.g., the one or more sensors 108, in the example shown in FIG. 2) to the point in the 3D point cloud 132. If the laser ray intersects a cell of the tessellation, the computing device 104 can add the cell to the tessellation included set. In this context, laser ray tracing refers to computing where a straight line leaving the sensor frame (e.g., sensor frame 136) in the direction of a laser point would intersect with the tessellation 130.

The first technique is advantageously designed to remove unnecessary cells from use in solving for the 3D pose. In solving for the 3D pose, the computing device 104, as described in more detail later in this description, can perform an optimization technique involving iteratively finding the closest cell in the tessellation 130 to each point in the 3D point cloud 132. Thus, by removing unnecessary cells with the first filtering technique, the computing device 104 can increase the optimization speed and reduces or eliminates the chance of matching to invisible cells (e.g., cells behind laser ray intersections, cells on the bottom or inner surface of the tessellation 130), thereby making the matching process more reliably and robust when solving for the 3D pose of the workpiece 102.

Furthermore, the first technique introduces noise into the measured points of the 3D point cloud 132 with a number of iterations such that cells that neighbor a particular cell can also be included in the tessellation included set. This can help to account for inaccuracies in pose, allowing the optimization of the solving process move points onto nearby cells with an improved match. In some embodiments, the computing device 104 can introduce random noise. In alternative embodiments, the computing device 104 can introduce a form of predetermined noise.

An example of the first technique will now be described with respect to FIG. 2. The computing device 104 adds noise 154 to point 148 and traces laser ray 156 from the origin of the right sensor of the one or more sensors 108 to point 148. Multiple smaller points surrounded by a dashed circle is used in FIG. 2 to designate the noise 154 and where the noise 154 is located. Based on the computing device 104 determining that laser ray 156 intersects triangle 140, the computing device 104 adds triangle 140 to the tessellation included set. Furthermore, the computing device 104 traces other respective laser rays (not shown) from the origin of the right sensor to each of the multiple smaller points that make up the noise 154. As a result, the respective laser rays would intersect triangle 142 and triangle 144, which neighbor triangle 140. Thus, the noise 154 added to point 148 can allow for triangle 142 and triangle 144 to be added to the tessellation included set. This example implementation of the first technique can also involve adding noise (not shown) to point 150 and tracing laser ray 158 from the right sensor of the one or more sensors 108 to point 150. Because laser ray 158 does not intersect a triangle, no such triangle will be included in the tessellation included set and point 150 might not be used for matching when solving for the 3D pose of the workpiece 102.

In practice, the accuracy of a laser point measurement from a time-of-flight (e.g., LIDAR) or a triangulation laser can be affected by the normality of the surface that the point's corresponding laser ray intersects. Surfaces that are more normal to the laser ray (e.g., cells representing surfaces of the workpiece 102 that face the one or more sensors 108 within a predefined threshold angle) can reflect light more accurately and reliably. Thus, the computing device 104 can advantageously use a second technique to filter out poor quality laser returns by considering the angle between laser rays and the normals of cells intersected by the laser rays. The normal of a particular cell, which can depend on the initial estimated pose of the workpiece 102, can be a direction of the cell's face, where each cell can have a unique normal depending on where its vertices are located. As a result of using the normal in this way, the computing device 104 can include, in the tessellation included set, only cells that reliably reflect laser rays, thus increasing confidence in the accuracy of the 3D point cloud 132.

More particularly, as an example of the second technique for filtering visible cells, for each laser return of the laser returns, the computing device 104 can trace a laser ray from one of the one or more mounted lasers 110 (e.g., the origin of one of the one or more sensors 108, in the example shown in FIG. 2) to a point in the 3D point cloud 132 and, if the laser ray intersects a cell of the tessellation 130 and an angle between the laser ray and a normal of the cell is less than a predefined threshold angle, the computing device 104 can add the cell to the tessellation included set. In other words, if the angle between the laser ray and the normal is less than the predefined threshold angle, the point is included in the matching algorithm used when solving for the 3D pose of the workpiece 102, which is described in more detail later in this description. The computing device 104 can compute the normal of the cell directly from the cell.

An example of the second technique will now be described with respect to FIG. 2. The computing device 104 traces laser ray 160 from the right sensor of the one or more sensors 108 to point 152. The computing device 104 also computes a normal 162 of triangle 146 (e.g., the direction of the face of triangle 146) and calculates an angle, θ, between laser ray 160 and the normal 162 of the triangle 146. If the computing device 104 determines that θ is less than a predefined threshold angle (e.g., approximately 70 degrees), the computing device 104 adds triangle 146 to the tessellation included set, whereas if the computing device 104 determines that θ is greater than or equal to the predefined threshold angle, the computing device 104 does not add triangle 146 to the tessellation included set. In an example, the predefined threshold angle is 70 degrees. In another example, the predefined threshold angle is 65 degrees. In yet another example, the predefined threshold is 75 degrees. (When θ is zero degrees, the reflection is normal and thus the most reliable, whereas when θ is 90 degrees, there might be no reflection.)

Once the computing device 104 has formed the tessellation included set with cells that meet the above-described filtering criteria, the computing device 104 can solve for the 3D pose of the workpiece 102 based on the tessellation included set. To facilitate this, the computing device 104 can construct an optimized data structure to look up cells in the tessellation included set and then solve for the 3D pose using a non-linear optimization technique. An optimized data structure allows for efficient spatial queries in solving for the 3D pose, compared to more computationally-expensive, brute force techniques.

As an example of how the computing device 104 constructs an optimized data structure to look up cells in the tessellation included set, the computing device 104 can use oriented bounding box trees (OBBTrees) to find, for each point in the 3D point cloud, a cell in the tessellation included set that is closest to the point. An OBBTree is used to determine how far away a point is from the tessellation 130 during non-linear optimization and is performed each iteration of the optimization for each point of the 3D point cloud 132 with respect to the cells in the tessellation included set. Phrased another way, the OBBTrees are used such that, in each iteration of the optimization, and for each point of the 3D point cloud 132, the cell from the tessellation included set that is closest to the point is found. In alternative embodiments, a different type of optimized data structure can be used, such as an octree or a k-d tree, among other possibilities.

The purpose of non-linear optimization is for the computing device 104 to determine the transformation between the robotic device 106 and the tessellation 130, which is a six degrees of freedom variable mathematically modelled as three parameters for translation and four parameters for rotation in quaternion format. In other words, the parameters that are optimized are the six degrees of freedom of the workpiece 102 with respect to the robotic device 106, which is the 3D pose of the workpiece 102 with respect to the robotic device 106.

As an example of how the computing device 104 solves for the 3D pose of the workpiece 102 using a non-linear optimization technique, the computing device 104 can use a non-linear least squares optimization for point matching. A simplified example of this is provided as follows.

Considering m laser data points in 3D space, $(x_1, y_1, z_1)$, $(x_2, y_2, z_2), \ldots, (x_m, y_m, z_m)$, and given a rigid transform, β, where $(\beta_1, \beta_2, \beta_3)$ are the three parameters for translation and $(\beta_4, \beta_5, \beta_6, \beta_7)$ are the four parameters for rotation (quaternion parameterization), the following equations can be used.

$$y = f_{map}(x, \beta) \quad \text{(Equation 1)}$$

$$f_{map}(x_i, \beta) = x_i * \beta^{-1} \quad \text{(Equation 2)}$$

$$d = f_{distance}(y) \quad \text{(Equation 3)}$$

$$r_i = f_{distance}(f_{map}(x_i, \beta)) \quad \text{(Equation 4)}$$

$$S = \Sigma_{i=1}^{m} r_i^2 \quad \text{(Equation 5)}$$

In these equations, $x_i$ refers to a laser data point and y refers to a laser data point that is transformed into the frame of the tessellation 130. Further, d and $r_i$ are equivalent and represent a distance between a point in the 3D point cloud 132 and the closest cell. The notation, $r_i$, refers to a residual (e.g., how close the data matches β. Further, S, is the sum of squared residuals, and the purpose of the optimization is to minimize S.

As such, β can be initialized based on a prior estimate of a pose of the robotic device 106 with respect to the tessellation 130. Equation 2 thus assumes that is defined as the 3D pose of the workpiece 102 with respect to the robotic device 106. For each point of the 3D point cloud 132, the computing device 104 (i) applies Equation 1 and Equation 2 to transform the point into the frame of the tessellation 130 and (ii) applies Equation 3 and Equation 4 to determine the distance, $r_i$, to a cell that is closest to the point. The computing device 104 then applies Equation 5 to determine the sum all squared distances, S, which is a measurement representing how well the points of the 3D point cloud 132 match the tessellation 130 given the transform, β, where a lower value of S represents a closer match. The computing device 104 can then apply standard non-linear least squares optimization techniques to estimate the gradient of S and mutate β to minimize S. In alternative embodiments, more or less parameters representing rotations around each axis (Euler angles) can be used. Further, in alternative embodiments, one or more other types of non-linear optimizations could be used.

Based on the 3D pose of the workpiece 102 relative to the robotic device 106, the computing device 104 can control operation of the robotic device 106. For example, the computing device 104 can control the robotic device 106 to sand the workpiece 102, grip the workpiece 102 using a robotic arm and gripper, move the workpiece 102, drill, paint, or weld the workpiece 102, and/or change its orientation and position in the environment relative to the workpiece 102. In an embodiment where the computing device 104 is remotely located from the robotic device 106 and separate from an onboard computing device of the robotic device 106, the act of controlling the robotic device 106 can involve the computing device 104 transmitting, to the onboard computing device, an instruction that, upon receipt of the instruction by the onboard computing device, causes the onboard computing device to control the robotic device 106 to perform one or more operations indicated in the instruction. Other examples of controlling the robotic device 106 to perform operations are possible as well.

As a result of the efficiently determination of a high-accuracy 3D pose of the workpiece 102 facilitate by one or both of the above-described filtering techniques, precise operations, such as manufacturing tasks (e.g., sanding the workpiece 102) can be performed with respect to the workpiece 102. Furthermore, the disclosed method described above improves over existing techniques such as ICP because the tessellation 130 is more representative of the real world than a point-set that would have to be generated from the tessellation 130 in order to perform ICP. Existing techniques such as ICP would involve sampling across all cell faces of the tessellation 130, which generates a large number of points and undesirably removes the fidelity of the cell surface representation of the workpiece 102.

Figure 3:
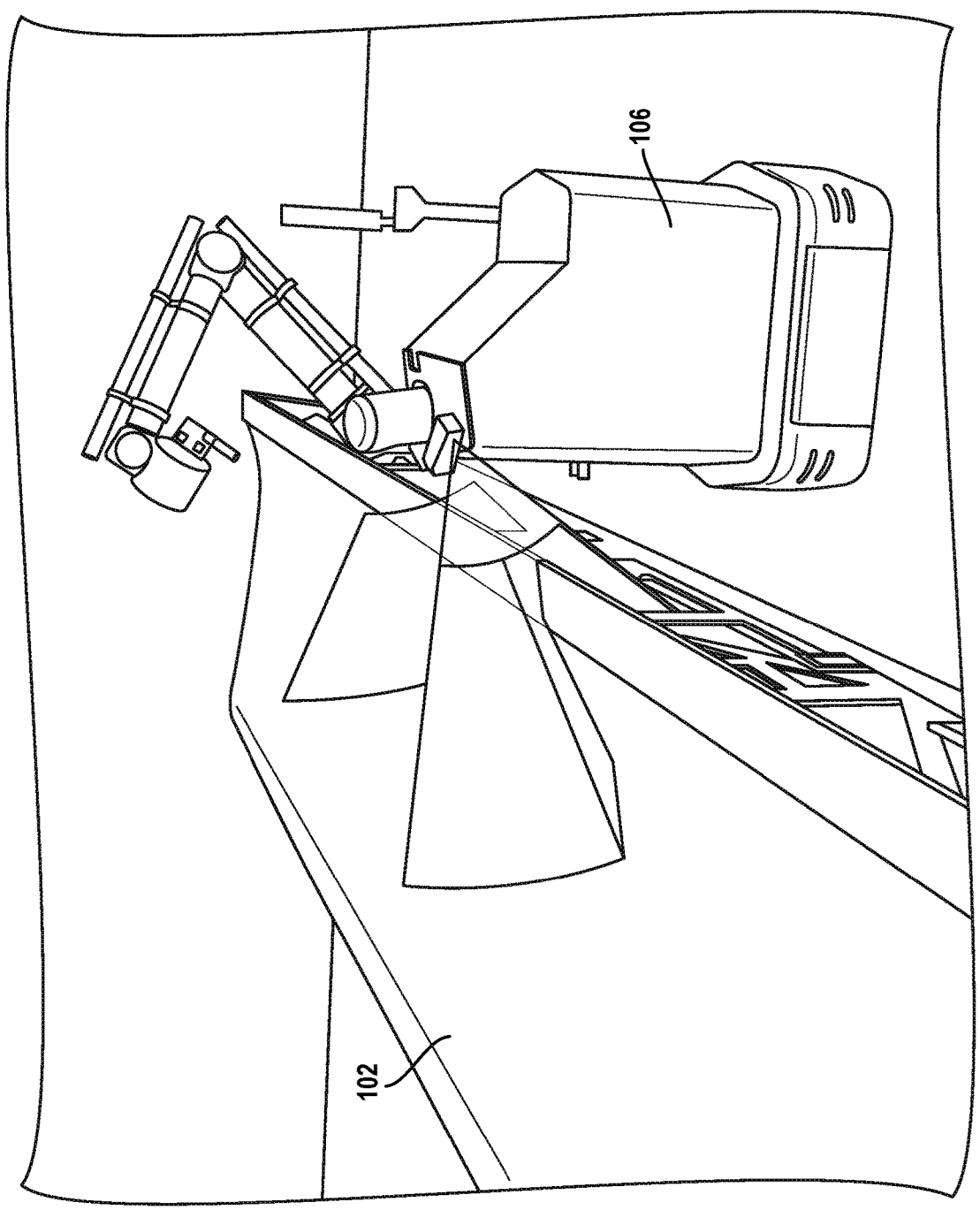
FIG. 3 depicts a robotic device scanning a workpiece, according to an example implementation.

FIG. 3 depicts the robotic device 106 scanning the workpiece 102.

Figure 4:
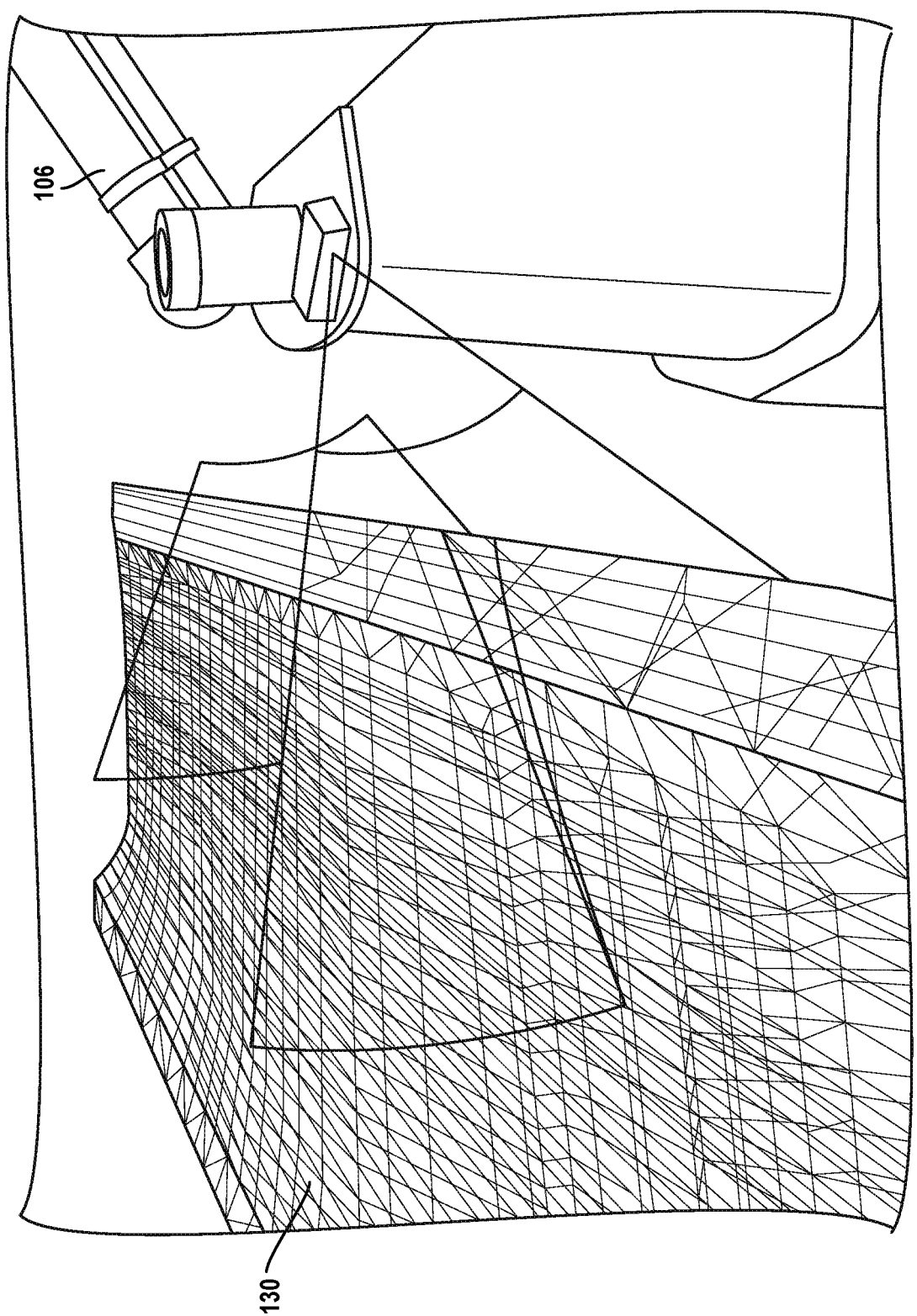
FIG. 4 depicts an example virtual representation of a robotic device and a tessellation of a workpiece, according to an example implementation.

FIG. 4 depicts an example virtual representation of the robotic device 106 and the tessellation 130 of the workpiece 102, where the tessellation includes various triangles.

Figure 5:
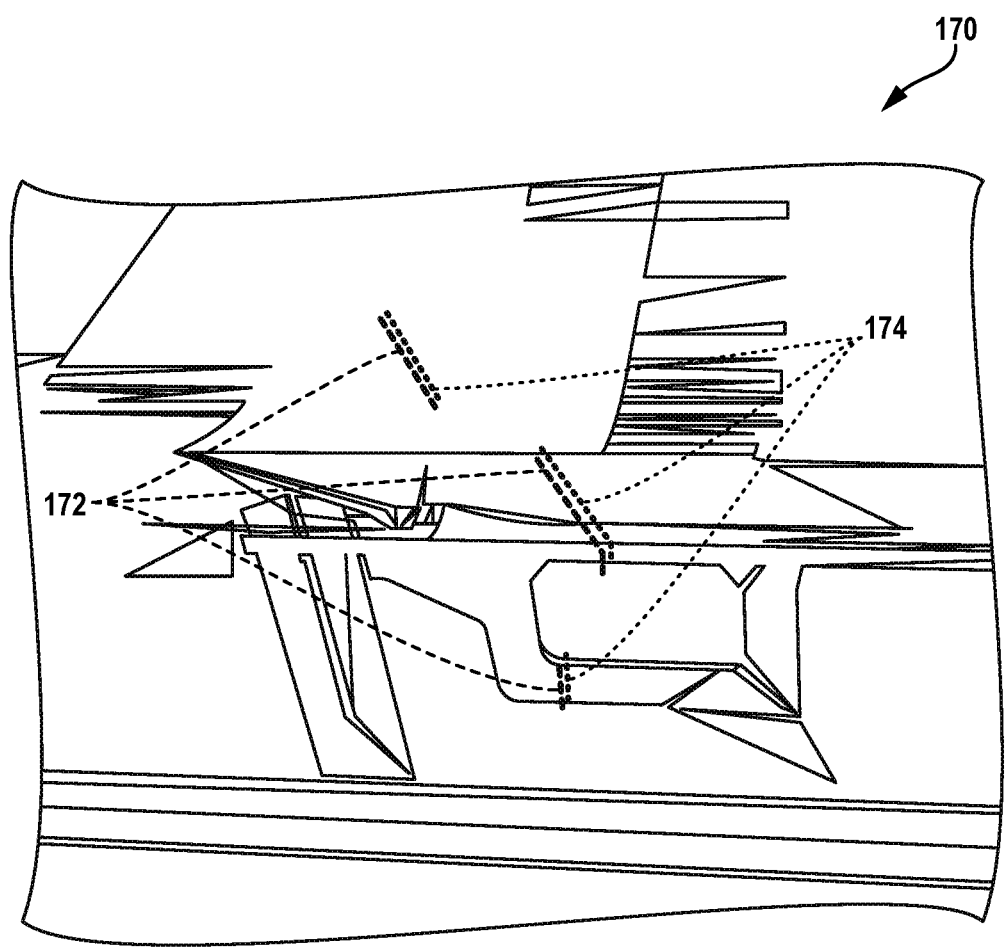
FIG. 5 depicts an image of a tessellation included set, according to an example implementation.

FIG. 5 depicts an image of an example of a tessellation included set 170—that is, the cells of the tessellation 130 that remain after one or more of the filtering techniques are performed. As further shown, dashed lines 172 represent an estimate of the 3D pose of the workpiece 102 relative to the robotic device 106 before non-linear optimization is applied, and dotted lines 174 represents the 3D pose of the workpiece 102 after non-linear optimization is applied to solve for the 3D pose of the workpiece.

Figure 6:
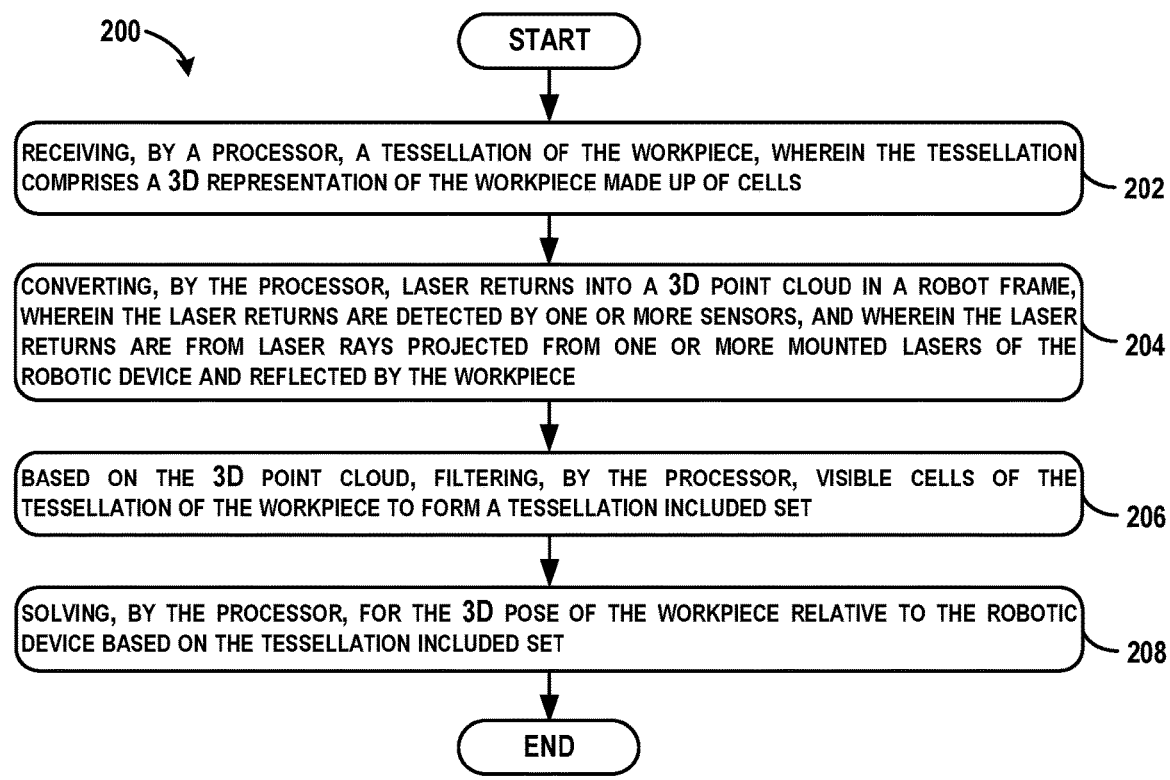
FIG. 6 shows a flowchart of an example method for registering a 3D pose of a workpiece relative to a robotic device, according to an example implementation.

FIG. 6 shows a flowchart of an example of a method 200 that could be used with the system 100, the workpiece 102, the tessellation 130, and the 3D point cloud 132 shown in FIGS. 1, 2, 3, 4, and 5. Method 200 includes operations, functions, or actions as illustrated by one or more of blocks 202-208.

At block 202, the method 200 includes receiving, by a processor, a tessellation of the workpiece, wherein the tessellation comprises a 3D representation of the workpiece made up of cells.

At block 204, the method 200 includes converting, by the processor, laser returns into a 3D point cloud in a robot frame, wherein the laser returns are detected by one or more sensors, and wherein the laser returns are from laser rays projected from one or more mounted lasers of the robotic device and reflected by the workpiece.

At block 206, the method 200 includes based on the 3D point cloud, filtering, by the processor, visible cells of the tessellation of the workpiece to form a tessellation included set.

At block 208, the method 200 includes solving, by the processor, for the 3D pose of the workpiece relative to the robotic device based on the tessellation included set.

Figure 7:
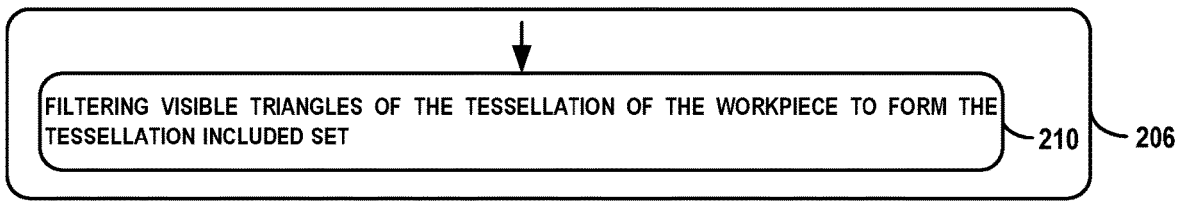
FIG. 7 shows a flowchart of an example method for performing the filtering function of the method of FIG. 6, according to an example implementation.

FIG. 7 shows a flowchart of an example method for performing the filtering as shown in block 206, particularly in an embodiment where the cells of the tessellation are triangles. At block 210, functions include filtering visible triangles of the tessellation of the workpiece to form the tessellation included set.

Figure 8:
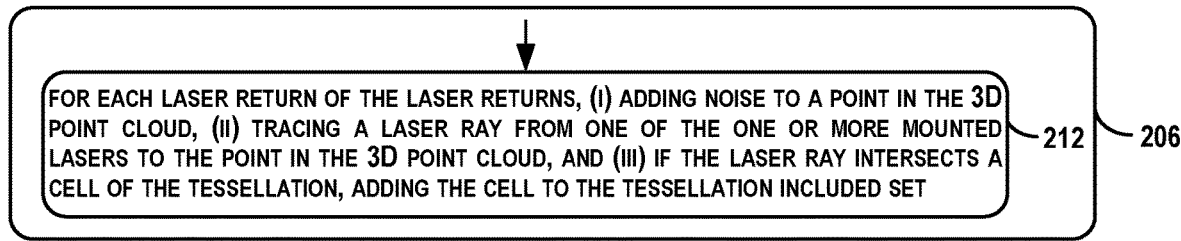
FIG. 8 shows a flowchart of another example method for performing the filtering function of the method of FIG. 6, according to an example implementation.

FIG. 8 shows a flowchart of an example method for performing the filtering as shown in block 206. At block 212, functions include for each laser return of the laser returns, (i) adding noise to a point in the 3D point cloud, (ii) tracing a laser ray from one of the one or more mounted lasers to the point in the 3D point cloud, and (iii) if the laser ray intersects a cell of the tessellation, adding the cell to the tessellation included set.

Figure 9:
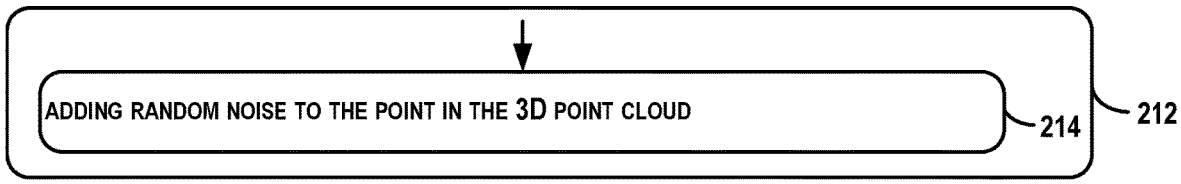
FIG. 9 shows a flowchart of an example method for performing the adding function of the method of FIG. 8, according to an example implementation.

FIG. 9 shows a flowchart of an example method for performing the adding shown in block 212. At block 214, functions include adding random noise to the point in the 3D point cloud.

Figure 10:
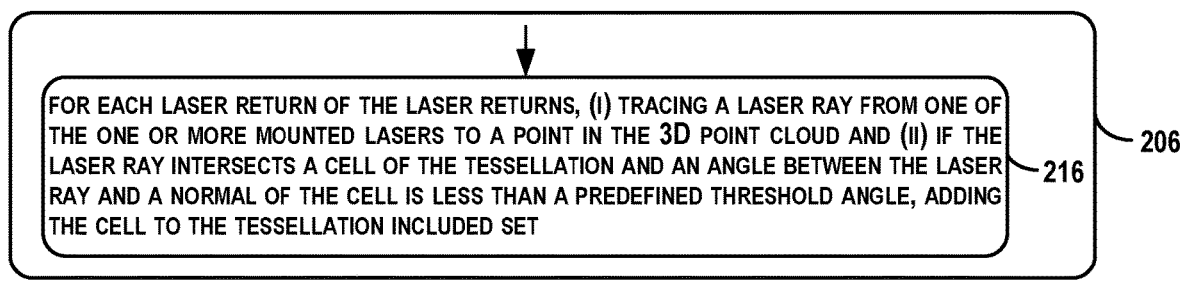
FIG. 10 shows a flowchart of another example method for performing the filtering function of the method of FIG. 6, according to an example implementation.

FIG. 10 shows a flowchart of an example method for performing the filtering as shown in block 206. At block 216, functions include for each laser return of the laser returns, (i) tracing a laser ray from one of the one or more mounted lasers to a point in the 3D point cloud and (ii) if the laser ray intersects a cell of the tessellation and an angle between the laser ray and a normal of the cell is less than a predefined threshold angle, adding the cell to the tessellation included set.

Figure 11:
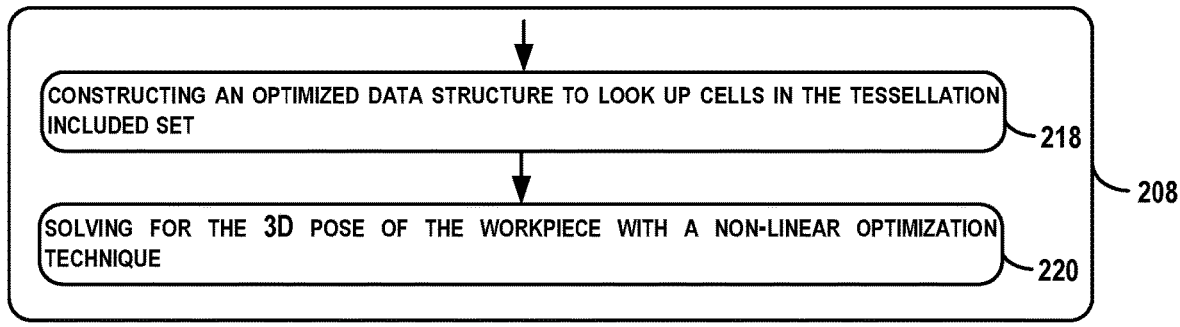
FIG. 11 shows a flowchart of an example method for performing the solving function of the method of FIG. 6, according to an example implementation.

FIG. 11 shows a flowchart of an example method for performing the solving as shown in block 208. At block 218, functions include constructing an optimized data structure to look up cells in the tessellation included set. And at block 220, functions include solving for the 3D pose of the workpiece with a non-linear optimization technique.

Figure 12:
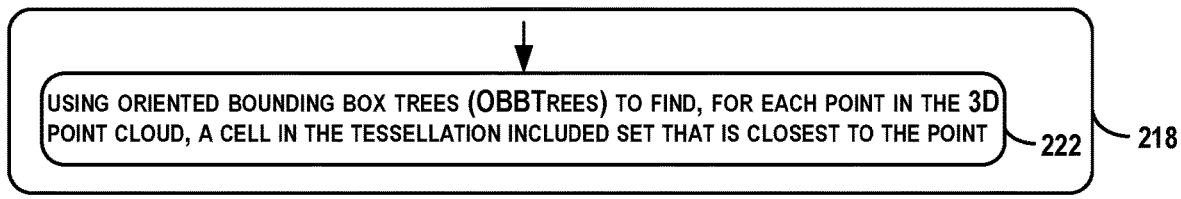
FIG. 12 shows a flowchart of an example method for performing the constructing function of the method of FIG. 11, according to an example implementation.

FIG. 12 shows a flowchart of an example method for performing the constructing as shown in block 218. At block 222, functions include using oriented bounding box trees (OBBTrees) to find, for each point in the 3D point cloud, a cell in the tessellation included set that is closest to the point.

Figure 13:
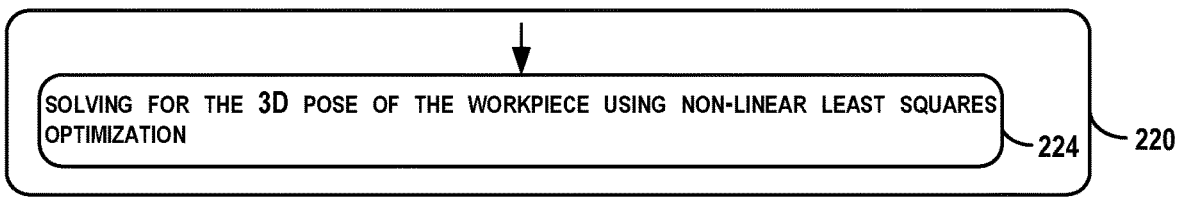
FIG. 13 shows a flowchart of an example method for performing the solving function of the method of FIG. 11, according to an example implementation.

FIG. 13 shows a flowchart of an example method for performing the solving as shown in block 220. At block 224, functions include solving for the 3D pose of the workpiece using non-linear least squares optimization.

Figure 14:
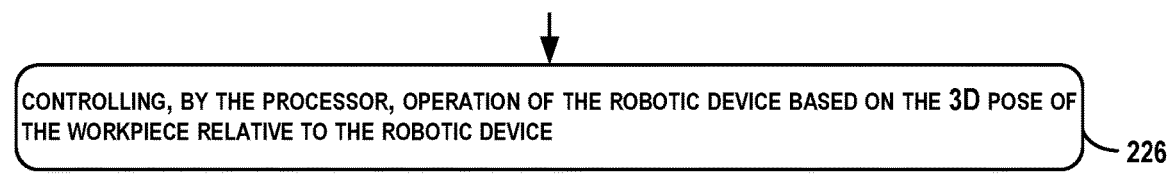
FIG. 14 shows a flowchart of an example method for use with the method of FIG. 6, according to an example implementation.

FIG. 14 shows a flowchart of an example method for use with the method 200. At block 226, functions include controlling, by the processor, operation of the robotic device based on the 3D pose of the workpiece relative to the robotic device.

Devices or systems may be used or configured to perform logical functions presented in FIGS. 6, 7, 8, 9, 10, 11, 12, 13, and 14. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Although blocks in FIGS. 6, 7, 8, 9, 10, 11, 12, 13, and 14, are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for these and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIGS. 6, 7, 8, 9, 10, 11, 12, 13, and 14 may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A registration system for registering a three-dimensional (3D) pose of a workpiece relative to a robotic device, the registration system comprising:
   the robotic device, wherein the robotic device comprises one or more mounted lasers;
   one or more sensors configured to detect laser returns from laser rays projected from the one or more mounted lasers and reflected by the workpiece; and
   a processor configured to:
      receive a tessellation of the workpiece, wherein the tessellation comprises a 3D representation of the workpiece made up of cells;
      convert the laser returns into a 3D point cloud in a robot frame;
      based on the 3D point cloud, filter visible cells of the tessellation of the workpiece to form a tessellation included set; and
      solve for the 3D pose of the workpiece relative to the robotic device based on the tessellation included set.

2. The registration system of claim 1, wherein the cells are triangles, and
   wherein filtering visible cells of the tessellation of the workpiece to form the tessellation included set comprises filtering visible triangles of the tessellation of the workpiece to form the tessellation included set.

3. The registration system of claim 1, wherein filtering the visible cells of the tessellation of the workpiece to form the tessellation included set comprises:
   for each laser return of the laser returns, (i) adding noise to a point in the 3D point cloud, (ii) tracing a laser ray from one of the one or more mounted lasers to the point in the 3D point cloud, and (iii) if the laser ray intersects a cell of the tessellation, adding the cell to the tessellation included set.

4. The registration system of claim 3, wherein adding the noise to the point in the 3D point cloud comprises adding random noise to the point in the 3D point cloud.

5. The registration system of claim 1, wherein filtering the visible cells of the tessellation of the workpiece to form the tessellation included set comprises:
   for each laser return of the laser returns, (i) tracing a laser ray from one of the one or more mounted lasers to a point in the 3D point cloud and (ii) if the laser ray intersects a cell of the tessellation and an angle between the laser ray and a normal of the cell is less than a predefined threshold angle, adding the cell to the tessellation included set.

6. The registration system of claim 1, wherein solving for the 3D pose of the workpiece based on the tessellation included set comprises:
   constructing an optimized data structure to look up cells in the tessellation included set; and
   solving for the 3D pose of the workpiece with a non-linear optimization technique.

7. The registration system of claim 6, wherein constructing the optimized data structure to look up cells in the tessellation included set comprises using oriented bounding box trees (OBBTrees) to find, for each point in the 3D point cloud, a cell in the tessellation included set that is closest to the point.

8. The registration system of claim 6, wherein solving for the 3D pose of the workpiece with the non-linear optimization technique comprises solving for the 3D pose of the workpiece using non-linear least squares optimization.

9. A method for registering a three-dimensional (3D) pose of a workpiece relative to a robotic device, the method comprising:
   receiving, by a processor, a tessellation of the workpiece, wherein the tessellation comprises a 3D representation of the workpiece made up of cells;
   converting, by the processor, laser returns into a 3D point cloud in a robot frame, wherein the laser returns are detected by one or more sensors, and wherein the laser returns are from laser rays projected from one or more mounted lasers of the robotic device and reflected by the workpiece;
   based on the 3D point cloud, filtering, by the processor, visible cells of the tessellation of the workpiece to form a tessellation included set; and
   solving, by the processor, for the 3D pose of the workpiece relative to the robotic device based on the tessellation included set.

10. The method of claim 9, wherein the cells are triangles, and
    wherein filtering visible cells of the tessellation of the workpiece to form the tessellation included set comprises filtering visible triangles of the tessellation of the workpiece to form the tessellation included set.

11. The method of claim 9, wherein filtering the visible cells of the tessellation of the workpiece to form the tessellation included set comprises:
    for each laser return of the laser returns, (i) adding noise to a point in the 3D point cloud, (ii) tracing a laser ray from one of the one or more mounted lasers to the point in the 3D point cloud, and (iii) if the laser ray intersects a cell of the tessellation, adding the cell to the tessellation included set.

12. The method of claim 11, wherein adding the noise to the point in the 3D point cloud comprises adding random noise to the point in the 3D point cloud.

13. The method of claim 9, wherein filtering the visible cells of the tessellation of the workpiece to form the tessellation included set comprises:
    for each laser return of the laser returns, (i) tracing a laser ray from one of the one or more mounted lasers to a point in the 3D point cloud and (ii) if the laser ray intersects a cell of the tessellation and an angle between the laser ray and a normal of the cell is less than a predefined threshold angle, adding the cell to the tessellation included set.

14. The method of claim 9, wherein solving for the 3D pose of the workpiece based on the tessellation included set comprises:
- constructing an optimized data structure to look up cells in the tessellation included set; and
- solving for the 3D pose of the workpiece with a non-linear optimization technique.

15. The method of claim 14, wherein constructing the optimized data structure to look up cells in the tessellation included set comprises using oriented bounding box trees (OBBTrees) to find, for each point in the 3D point cloud, a cell in the tessellation included set that is closest to the point.

16. The method of claim 14, wherein solving for the 3D pose of the workpiece with the non-linear optimization technique comprises solving for the 3D pose of the workpiece using non-linear least squares optimization.

17. The method of claim 9, further comprising:
- controlling, by the processor, operation of the robotic device based on the 3D pose of the workpiece relative to the robotic device.

18. A non-transitory computer readable medium having stored thereon instructions, that when executed by one or more processors of a computing device, cause the computing device to perform operations comprising:
- receiving a tessellation of a workpiece, wherein the tessellation comprises a three-dimensional (3D) representation of the workpiece made up of cells;
- converting laser returns into a 3D point cloud in a robot frame, wherein the laser returns are detected by one or more sensors, and wherein the laser returns are from laser rays projected from one or more mounted lasers of a robotic device and reflected by the workpiece;
- based on the 3D point cloud, filtering visible cells of the tessellation of the workpiece to form a tessellation included set; and
- based on the tessellation included set, solving for a 3D pose of the workpiece relative to the robotic device.

19. The non-transitory computer readable medium of claim 18, wherein the cells are triangles, and
- wherein filtering visible cells of the tessellation of the workpiece to form the tessellation included set comprises filtering visible triangles of the tessellation of the workpiece to form the tessellation included set.

20. The non-transitory computer readable medium of claim 18, wherein filtering the visible cells of the tessellation of the workpiece to form the tessellation included set comprises:
- for each laser return of the laser returns, (i) adding noise to a point in the 3D point cloud, (ii) trace a laser ray from one of the one or more mounted lasers to the point in the 3D point cloud, and (iii) if the laser ray intersects a cell of the tessellation, add the cell to the tessellation included set.

* * * * *